US008423966B2

United States Patent
Dolby et al.

(10) Patent No.: US 8,423,966 B2
(45) Date of Patent: Apr. 16, 2013

(54) USING ATOMIC SETS OF MEMORY LOCATIONS

(75) Inventors: Julian Dolby, Bronx, NY (US); Frank Tip, Ridgewood, NJ (US); Mandana Vaziri, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 12/754,012

(22) Filed: Apr. 5, 2010

(65) Prior Publication Data

US 2010/0192131 A1 Jul. 29, 2010

Related U.S. Application Data

(63) Continuation of application No. 11/150,611, filed on Jun. 10, 2005, now Pat. No. 7,716,645.

(51) Int. Cl.
*G06F 9/44* (2006.01)
*G06F 9/45* (2006.01)

(52) U.S. Cl.
USPC ........... 717/126; 717/116; 717/121; 717/127; 717/154

(58) Field of Classification Search ........................ None
See application file for complete search history.

(56) References Cited

U.S. PATENT DOCUMENTS

| | | | | |
|---|---|---|---|---|
| 6,769,116 | B1 * | 7/2004 | Sexton | 717/130 |
| 6,854,108 | B1 * | 2/2005 | Choi | 717/125 |
| 6,918,006 | B1 * | 7/2005 | Archibald et al. | 711/114 |
| 7,430,670 | B1 * | 9/2008 | Horning et al. | 713/190 |
| 7,765,525 | B1 * | 7/2010 | Davidson et al. | 717/124 |
| 2002/0138706 | A1 * | 9/2002 | Hugly | 711/163 |
| 2003/0065892 | A1 * | 4/2003 | Bonola | 711/147 |
| 2004/0093605 | A1 * | 5/2004 | Alverson et al. | 719/310 |
| 2005/0021898 | A1 * | 1/2005 | Alverson et al. | 711/1 |
| 2005/0262313 | A1 * | 11/2005 | Holt | 711/150 |
| 2005/0283780 | A1 * | 12/2005 | Karp et al. | 718/100 |
| 2006/0277374 | A1 * | 12/2006 | von Praun et al. | 711/152 |
| 2008/0109608 | A1 * | 5/2008 | Shavit et al. | 711/141 |

OTHER PUBLICATIONS

Cormac Flanagan, Shaz Qadeer, "A Type and Effect System for Atomicity," 2003.
K. Rustan, M. Leino, "Data Groups: specifying the modification of extended state," 1998.
Michael Burrows and K. Rustan M. Leino, "Finding stale-value errors in concurrent programs," SRC Technical Note 2002-004, May 14, 2002.

(Continued)

*Primary Examiner* — Isaac Tecklu
(74) *Attorney, Agent, or Firm* — Michael J. Buchenhorner; Vazken Alexanian

(57) ABSTRACT

A system and method for ensuring consistency of data and preventing data races, including steps of: receiving and examining a computer program written in an object-oriented language; receiving sequences of accesses that form logical operations on a set of memory locations used by the program; receiving definitions of atomic sets of data from the memory locations, wherein said atomic sets are sets of data that indicate an existence of a consistency property without requiring the consistency property itself; inferring which code blocks of the computer program must be synchronized in order to prevent one or more data races in the computer program, wherein synchronization is inferred by determining by analysis for each unit of work, what atomic sets are read and written by the unit of work; and providing a message indicating where synchronization is required.

19 Claims, 7 Drawing Sheets

OTHER PUBLICATIONS

Cyrille Artho, Llaus Havelund, Armin Biere, "High-Level Data Races," Workshop on Verification and Validation of Enterprise Information System (V Veis, Apr. 2003).

Liqiang Wang, Scott D. Stoller, "Runtime Analysis of Atomicity for Multi-threaded Programs," Procedure of the Third Workshop on Runtime Verification (RV03), 2003.

Zianghua Deng, Matthew B. Dwyer, John Hatcliff, Masaaki Mizuno, "Invariant-based Specification, Synthesis, and Verification of Synchronization in Concurrent Programs," International Conf. on Software Engineering (ICSE) May 2002.

\* cited by examiner

```
public class Shape {
    atomic(loc) double x = 0.0;
    atomic(loc) double y = 0.0;
    atomic(dim) double width = 0.0;
    atomic(dim) double height = 0.0;

public void adjustLocation(){
        x++; y++;
    } public void adjustDimensions(){
        width++; height++;
    } public void print(){
        double lx, ly, lwidth, lheight;
        adjustLocation();
        lx = x; ly = y;
        adjustDimensions();
        lwidth = width; lheight = height;
        System.out.println("x= " + lx + " y="+ ly +
        " width=" + width +
            " height=" + height);
    }
}
```

*FIG. 1*

```
public class Shape {
        double x = 0.0;
        double y = 0.0;
        double width = 0.0;
        double height = 0.0;

Object loc_lock = new Object();
        Object dim_lock = new Object();

public void adjustLocation() {
                synchronized(loc_lock) {
                        x++; y++;
                }
        } public void adjustDimensions(){
                synchronized(dim_lock)} {
                        width++; height ++;
                }
        } public void print(){
                double lx, ly, lwidth, lheight;
                synchronized(loc_lock)}{
                adjustLocation();
                lx = x; ly = y;
                }
                synchronized(dim_lock)}{
                adjustDimensions();
                lwidth = width; lheight = height;
                }
                System.out.println("x= " + lx + " y="+ ly +
                " width=" + width +
                        " height=" + height);
        }
                                        }
```

*FIG. 2*

| | Interleaving Scenario | Description |
|---|---|---|
| 1 | $R_u(l)\ W_{u'}(l)\ W_u(l)$ | Value read becomes stale by the time an update is made in $u$. |
| 2 | $R_u(l)\ W_{u'}(l)\ R_u(l)$ | Two reads of the same location yield different values in $u$. |
| 3 | $W_u(l)\ R_{u'}(l)\ W_u(l)$ | An intermediate state is observed by $u'$. |
| 4 | $W_u(l)\ W_{u'}(l)\ R_u(l)$ | Value read is not the same as the one written last in $u$. |
| 5 | $W_u(l)\ W_{u'}(l)\ W_u(l)$ | Value written by $u'$ is lost. |
| 6 | $W_u(l_1)\ W_{u'}(l)\ W_{u'}(L-l)\ W_u(l_2)$ | Memory is left in an inconsistent state. |
| 7 | $W_u(l_1)\ W_{u'}(l_2)\ W_u(l_2)\ W_{u'}(l_1)$ | same as above. |
| 8 | $W_u(l_1)\ R_{u'}(l)\ R_{u'}(L-l)\ W_u(l_2)$ | State observed is inconsistent. |
| 9 | $R_u(l_1)\ W_{u'}(l)\ W_{u'}(L-l)\ R_u(l_2)$ | same as above. |
| 10 | $R_u(l_1)\ W_{u'}(l_2)\ R_u(l_2)\ W_{u'}(l_1)$ | same as above. |
| 11 | $W_u(l_1)\ R_{u'}(l_2)\ W_u(l_2)\ R_{u'}(l_1)$ | same as above. |

*FIG. 3*

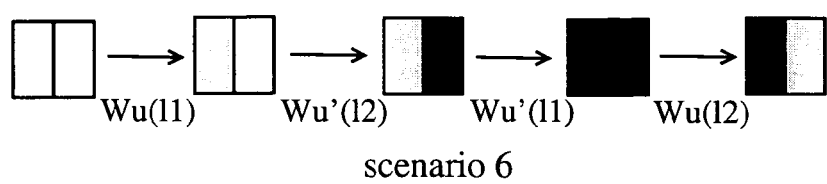
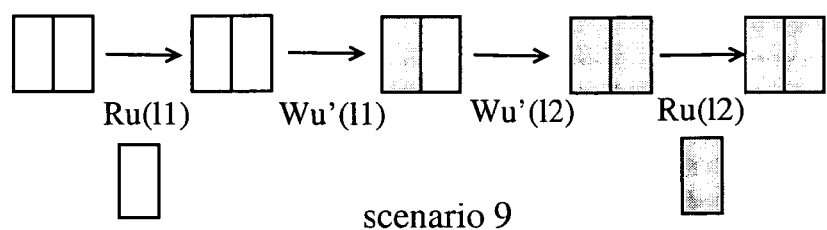
*FIG. 4*

| index i | event | ts(i) | temp($u_1$,i,$l_1$) | temp($u_1$,i,$l_2$) temp($u_2$,i,$l_1$) temp($u_2$,i,$l_2$) |
|---|---|---|---|---|
| 1 | $W_{u1}(l_1)$ | 1 | true | false |
| 2 | $R_{u2}(l_1)$ | 1 | true | false |
| 3 | $R_{u2}(l_2)$ | 0 | true | false |
| 4 | $W_{u1}(l_2)$ | 1 | true | false |
| 5 | $W_{u2}(l_1)$ | 2 | true | false |
| 6 | $W_{u2}(l_2)$ | 2 | true | false |
| 7 | $W_{u1}(l_1)$ | 1 | false | false |

*FIG. 5*

```
FieldDeclaration    ::= modifiers var
modifiers           ::= atomic(label)
```

*FIG. 6*

```
for each unit-of-work UW obtain call graph subgraph G for UW traverse G bottom-up for each SCC S {

Reads(S) = LocalReads(S) +

Union(Reads(X) |for each callee SCC X)

Writes(S) = LocalWrites(S) +

Union(Writes(X) |for each callee SCC X)

USING ATOMIC SETS OF MEMORY LOCATIONS

CROSS-REFERENCE TO RELATED APPLICATIONS

This application is a continuation of, and claims priority from, commonly-owned, U.S. patent application Ser. No. 11/150,611, filed on Jun. 10, 2005, now U.S. Pat. No. 7,716,645 which is incorporated by reference as if fully set forth herein.

STATEMENT REGARDING FEDERALLY SPONSORED-RESEARCH OR DEVELOPMENT

Patent application Ser. No. 11/150,611, from which this application claims priority, was made with Government support under contract No. NBCH3039004 awarded by DARPA (PERCS Phase II). The United States Government has certain rights under the invention.

INCORPORATION BY REFERENCE OF MATERIAL SUBMITTED ON A COMPACT DISC

None.

FIELD OF THE INVENTION

The invention disclosed broadly relates to the field of information processing, and more particularly relates to the field of software development and debugging.

BACKGROUND OF THE INVENTION

Data races are intermittent bugs that arise in concurrent programs. They result in incorrect behavior under certain interleavings of the code, and are hard to find and debug. The most common definition of a data race is two concurrent accesses to a memory location with no synchronization between them where at least one of which is a write. This definition has two shortcomings. First, there is a circularity in that synchronization is what we use to prevent data races, so defining races in terms of synchronization is unsatisfying. Second, a program in which every access is protected can nevertheless display problematic interleavings. This is the case when the granularity of locking is not adequate. An example of these "high-level" data races is stale-value errors, local copies of shared variables that are used beyond an appropriate scope. See M. Burrows and K. R. M. Leino. "Finding stale-value errors in concurrent programs". SRC Technical Note 2002-004, May 2002. Therefore there is a need for a system and method of ensuring consistency of data and preventing data races that avoids the shortcomings of prior approaches.

SUMMARY OF THE INVENTION

Briefly, according to an embodiment of the invention a system and method includes steps or acts of receiving and examining a computer program written in an object-oriented language; receiving sequences of accesses that form logical operations on a set of memory locations used by the program; receiving definitions of atomic sets of memory locations, each consisting of pieces of data; providing a message indicating where the synchronization is required.

BRIEF DESCRIPTION OF THE DRAWINGS

To describe the foregoing and other exemplary purposes, aspects, and advantages, we use the following detailed description of an exemplary embodiment of the invention with reference to the drawings, in which:

FIG. 1 shows a class shape.

FIG. 2 shows the result of a synchronization inference, which added two locks, loc_lock and dim_lock for each of the atomic sets.

FIG. 3 shows a complete set of interleaving scenarios that are problematic.

FIG. 4 illustrates some of the scenarios where memory is updated inconsistently.

FIG. 5 gives a sample execution and its timestamps.

FIG. 6 provides the syntax of atomic set constructs.

FIG. 7 shows pseudocode for the first step in a synchronization inference.

Figure 8:
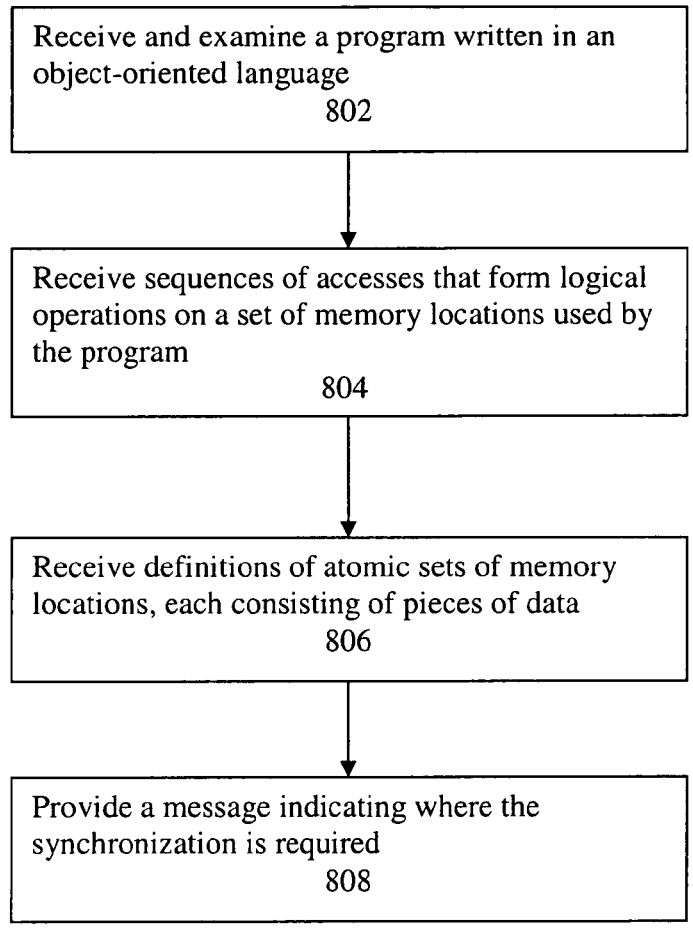
FIG. 8 is a flowchart of a method according to an embodiment of the invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

According to an embodiment of the invention we use a program written in an object-oriented language such as Java. A new language construct allows the programmer to express what fields form atomic sets, meaning that there exists a consistency property among these memory locations, and that they must be accessed and updated atomically (i.e., without interruption). Based on this information, an inference engine analyzes accesses to these atomic sets and infers appropriate synchronization blocks in the code automatically.

The inference engine assumes the existence of units of work, code blocks that mark transactional boundaries. In Java, the methods of a class naturally form units of work for all atomic sets declared in that class. The analysis builds call graphs rooted at each of these, and propagates accesses to an atomic set in a bottom-up fashion. Synchronization is added to the code to ensure that in any execution, units of work are serializable for each atomic set, i.e. for each the execution is equivalent in behavior to one where all units of work happened in some serial order. To this end, we have developed a new definition for high-level data races, consisting of a complete set of non-serializable access patterns, and synchronization is inferred in such a way so as to prevent these interleaving scenarios. A proof establishes that an execution that does not display any of these patterns has the property that for each atomic set, there exists a serial order of units of work, as required.

According to this embodiment of the invention, a new definition for high-level data races is presented that is based on an adaptation of anomalies used to characterize different isolation levels in databases. See ANSI X3.135—1992, American National Standard for Information Systems—Database Language—SQL, November 1992. Commercial databases allow programmers to trade off consistency for performance by offering different levels of isolation. Each level is characterized by the set of anomalies it does not allow. The highest level of isolation is serializability, where an execution is equivalent in behavior to one where all transactions have been executed in some serial order. We adapt the anomalies to the context of concurrent programming. Our definition of data races is based on possible non-serializability.

This definition covers both high-level and low-level data races, and generalizes the common definition in several respects. First, for a single memory location it identifies interleaving scenarios of concurrent accesses that are problematic. Database anomalies are also given as schedules, and this helps to give a more precise account of what constitutes a problematic interleaving, while avoiding the use of implementation constructs such as locks or synchronization. Second, it takes into account accesses to a set of memory locations that need to be updated atomically due to a consistency property, i.e. an atomic set. Our definition assumes the existence of units of work on atomic sets, which are a sequence of accesses forming a logical operation on the whole set. Units of work mark transactional boundaries, and when executed sequentially, restore the atomic set to a consistent state. Our definition overcomes the shortcomings of the common one in that it covers a larger class of problematic interleavings, it leaves out some benign cases that are considered as races by the low-level definition, and it is not based on an implementation construct. Both stale-value errors, and view consistency violations, where multiple reads in an operation observe an inconsistent state, are covered. See M. Burrows and K. R. M. Leino. "Finding stale-value errors in concurrent programs". SRC Technical Note 2002-004, May 2002 and C. Artho, K. Havelund, and A. Biere. "High-Level Data Races", In Workshop on Verification and Validation of Enterprise Information Systems (VVEIS), April 2003.

Our definition is given in terms of problematic interleaving scenarios for accesses to a single or a pair of memory locations. They can be applied pair-wise to atomic sets having more than two locations. We show that these scenarios are complete, in the sense that, if an execution does not display them then it satisfies a desirable property: its projection on each atomic set is serializable, meaning that if we only consider accesses to that atomic set; the execution is equivalent in behavior to one where units of work occur in a serial order. This property does not imply that the execution is serializable across all atomic sets, but that for each set, there exists a serial order of units of work. The intuition behind this correctness criterion is that we want each set to remain consistent, without reducing the amount of concurrency unnecessarily.

The new definition has several applications: (i) detecting data races, including high-level data races; (ii) uncovering unnecessary synchronization; and (iii) inferring which code blocks must be synchronized to prevent data races. In the embodiment discussed, we focus on the third application in the context of Java, presenting a system that infers synchronization for an API (application program interface). We now discuss a new language construct that allows the programmer to mark sets of fields of a class as forming atomic sets, and assume that the public and protected methods of that class form units of work for those sets. Our system uses this information to automatically add appropriate synchronization to that class. Note that if a method is a unit of work, that does not necessarily mean that its entire body needs synchronization. The units of work only indicate the boundaries of logical operations, and our system aims at finding the smallest code blocks within them that need synchronization. This application is useful when there are multiple independent sets of fields. The traditional approach is to have various locks corresponding to each set to allow more concurrency. This requires the programmer to keep track of all the locks, which can be error-prone, especially in the presence of subclassing. Atomic sets of fields are a high-level construct that remove some burden from the programmer, and help in producing correct synchronization.

The embodiment discussed herein (for purposes of illustration) works by building a call graph for an API, taking all public and protected methods as entry points. We do not rely on any particular call graph construction algorithm. The atomic sets accessed at each node are propagated from callees to callers, and the code blocks that need synchronization are detected based on the scenarios of problematic accesses, identified in our definition for high-level data races. As an approximation for this embodiment, we add synchronization to the smallest code blocks that surround all reads or writes to an atomic set in a unit of work, ignoring the intricacies of the scenarios.

FIG. 1 shows a class called Shape, which has two fields to indicate location, x and y, and two for dimension, width, and height. These fields form independent sets, and are updated separately with methods adjustLocation and adjustDimension. To make this class thread-safe, we could make each method synchronized, but that would decrease the amount of concurrency unnecessarily, because one could no longer update the location and dimensions—two orthogonal aspects—of Shape concurrently. While we are updating x and y, we do not want intermediate states to be visible. The atomic set construct allows us to express these properties directly as shown in FIG. 1. The modifier atomic(loc) on a field declaration indicates that the field belongs to atomic set loc, where loc is a label. Labels must be globally unique. Thus this class declares two sets loc and dim.

Atomic sets alone are not enough to determine what code fragment needs synchronization. They indicate the existence of a consistency property without requiring the property itself. We must therefore know what sequences of accesses form logical operations, or units of work, on the whole set, restoring it to a consistent state when executed sequentially. The goal of synchronization is to then make sure that for each atomic set, units of work are serializable, meaning that their effect on an atomic set is as if they were executed in some serial order. To simplify the job of the programmer, we make the assumption that the public and protected methods of an API are units of work for each of the atomic sets declared in that class, and do not require this information to be supplied directly.

FIG. 2 shows the result of a synchronization inference, which adds two locks, loc_lock and dim_lock for each of the atomic sets. The print method has an update access to atomic set loc (the call to adjustLocation), and two reads, and it includes all these accesses in the same synchronized block (similarly for the dim set). This prevents various high level data races. For example, if the reads of x and y are not in the same synchronized block, then they can observe a state of the two locations that never existed in memory: a value of x from one update, and one for y from another one. Also if adjustLocation is placed outside the synchronized block, then the reads can see a state corresponding to a different update, and that would result in a possible execution that is not serializable.

We now discuss a definition of high-level data races according to an embodiment of the invention. Consider an abstract model with a set of memory locations, where each location can be read and updated uninterruptedly by a set of threads. A thread is a sequence of reads and writes to individual memory locations, where each access belongs to some unit of work. Locations l1 and l2 are two locations forming an atomic set. We want to know under what circumstances l1 and l2 are read and updated inconsistently, i.e. what scenarios make it possible for intermediate states of updates to be observable, and result in non serializable executions. Some of the scenarios we present bear resemblance to database anomalies that characterize different levels of isolation in the ANSI SQL standard. In the following section, we show that these scenarios are complete, provided that each unit of work that does any write to an atomic set, writes all the locations in that set.

Let LS be the set of all memory locations. A subset $L \subseteq \mathcal{L}$ may be designated as atomic. An event is an access to a memory location $l \in \mathcal{L}$. Accesses can be a read R(l) or a write W(l). We assume that accesses to a single memory location are uninterrupted. The notation R(l) indicates a read of one of the memory locations in L, and similarly for W(l). If l denotes locations l1 or l2, we use the notation L−l to denote the other location.

A thread is a sequence of events. Subsequences of a thread form units of work. These are non-overlapping, and every event belongs to some unit of work. We write $Ru(l)$ for a read performed by unit of work u of some thread t, and similarly for writes. The notation thread(u) denotes the thread corresponding to u. Note that a unit of work can represent a logical operation for more than one atomic set. An execution is a sequence of events from one or more threads. An interleaving scenario is also a sequence of events. For example, $Ru(l)$ $Wu'(l)$ $Wu(l)$ is an interleaving scenario where unit of work u first reads l, then another unit of work u', from another thread, performs a write, followed by a write by u. An execution is in accordance with an interleaving scenario if it contains the events in the interleaving scenario, and these appear in the same order.

Referring to FIG. 3, there are shown a number of interleaving scenarios that are considered problematic. To define High-Level Data Races, we let L be an atomic set of locations, l1, l2∈L, l one of l1 or l2, and u and u' two units of work for L, such that thread(u)≠thread(u'). An execution has a data race if it is in accordance with one of the interleaving scenarios of FIG. 3.

We now consider the problematic interleaving scenarios and describe informally why these scenarios are problematic. These scenarios are complete provided that each unit of work that writes to an atomic set, writes all locations in that set. In the first scenario, unit of work u reads one location l, followed by an update to l. If another update to l is interleaved between the two, then the read operation yields a stale value and the subsequent update may be inconsistent. This scenario captures common "low-level" data races, such as two threads doing x++. Scenario 1 corresponds roughly to the "lost update" ANSI.X3.135 anomaly in databases: a transaction T1 reads a data item, then another transaction T2 updates the item, then T1 updates the item based on the value read and commits. The update of T2 is then lost.

The second scenario shows two consecutive reads of location l in a unit of work that do not yield the same value. It roughly corresponds to the "fuzzy read" anomaly in databases, where a transaction T1 reads a data item, then a second transaction T2 modifies that item and commits. If T1 attempts to re-read the same item, it receives a different value.

In a third scenario 3, an intermediate value of l is read, when a unit of work writes it multiple times. In scenario 4, the value read for l is not the same as the one last written in the same unit of work. In scenario 5, a write to l is lost, or hidden by the writes from some unit of work.

Referring now to FIG. 4, we illustrate scenarios 6 and 9 of FIG. 3. Scenarios 6 and 7 illustrate cases where memory is updated inconsistently. Recall that l denotes one of l1 or l2, and that L−l denotes the other. In scenario 6, a unit of work updates some location in the set, followed by an update to another location. Thus the whole set updated in multiple steps. If a write to the set is interleaved between the two, then memory is left in an inconsistent state since individual locations have values from different operations. A reader may then observe what appears to be intermediate states of various updates. Scenario 7 is similar.

Scenarios 8 through 11 (FIG. 4) illustrate cases where memory is read inconsistently, even if it may never have been written incorrectly. In scenario 9, one unit of work reads l1 followed by reading l2. Thus one thread is observing the state of multiple parts in the atomic set. If an update to the whole set is interleaved, then the values observed belong to different operations. The rest of the scenarios are problematic for a similar reason. These scenarios are similar to the "read skew" database anomaly.

All scenarios that only manipulate one memory location are marked as having a data race by the common definition. However, there are three scenarios missing $Ru(l)$ $Ru'(l)$ $Ru(l)$, $Wu(l)$ $Ru'(l)$ $Ru(l)$, and $Ru(l)$ $Ru'(l)$ $Wu(l)$. None of these are problematic, but the common definition marks the last two as having a race. Our definition avoids these benign cases. An example of the third scenario is a thread performing x++ and another printing the value of x, where the write of x is atomic. This is non-deterministic but serializable, so there is no data race.

Not all of the database anomalies are applicable in this context. Some are concerned with an erroneous behavior when a transaction aborts and rolls back: e.g. "dirty read" and "dirty write". Others refer to reading a set of memory locations that satisfy a search condition: "phantom read." Finally the "write skew" anomaly is covered by several of our scenarios.

We now show that the interleaving scenarios are complete, meaning that if an execution does not display them, then its projection on each atomic set is serializable, concepts that we define precisely below. To this end, we introduce a formal model of timestamps. Units of work can be totally ordered by the occurrence of their first write events in an execution. We associate a unique timestamp with each unit of work, respecting this order. A write event gets the timestamp of the unit of work to which it belongs. A read event gets the timestamp of the most recent write to the memory location it is reading. If a memory location gets written more than once by a unit of work, we mark the location as temporary, until the last write is completed. We use timestamps and temporary locations to capture consistency: if two reads get different timestamps, they are observing an inconsistent state. Likewise, observing a location marked as temporary by another unit of work is undesirable. We make the following assumption in our determination of completeness:

We assume that each execution is such that every unit of work that writes some location in an atomic set, writes every location in that atomic set. This assumption is not restrictive because we can always add "dummy writes" to any unit of work that does not satisfy it. Since this framework is oblivious to actual values written, the values written by these dummy writes do not matter. Furthermore, these dummy writes are needed only for analysis, and would be added only to the program representation being analyzed.

For an execution that is not in accordance with the interleaving scenarios of Definition 1, we show that the timestamp of writes to a given memory location are monotonically increasing (Lemma 1), and that no unit of work observes an inconsistent state (Lemma 2). These two properties suffice to show that the execution is serializable when projected on each atomic set (Theorem 1), using the Serializability Theorem from database theory.

Indices refer to a total order of events in an execution that is clear from context. A total order of events is natural for a sequentially consistent architecture. However, events happen in some total order even on weaker memory models, so our conceptual model is still applicable.

The function event(i) gives the event at index i in the execution. If u is a unit of work, then firstWrite(u) is the index of the first write event of u.

We assume that timestamps are drawn from the natural numbers, and that the indices in an execution start at 1. We use ts(u) to denote the timestamp of a unit of work that performs writes. We allocate timestamps to units of work in such a way that:

$$ts(u)<ts(u') \leftrightarrow \text{firstWrite}(u)<\text{firstWrite}(u').$$

So a unit of work u, whose first write happens before the first write of another unit of work u' in an execution, gets a lower timestamp. Given a total order of timestamps thus allocated, let prev(t) be the timestamp immediately preceding t in this order (prev(t)<t).

We associate a timestamp, ts(i), with an event at index i in the execution. Write events get the timestamp of the unit of work to which they belong, and read events get the timestamp of the most recent write to the memory location read. ts(i) is computed as follows:

$$ts(i) = \begin{vmatrix} ts(u) & \text{if event}(i) = W_u(1) \\ ts(j) & \text{if event}(i) = R_u(1) \land j < i \land \text{event}(j) = W_{\alpha'}(1) \\ & \land \alpha k \cdot j < k < i\xi \text{ event}(k) = W_\alpha \cdot (1) \\ 0 & \text{if event}(i) = R_u(1) \land \alpha j \cdot j < i\xi \text{ event}(j) = W_{\alpha'}(1) \end{vmatrix}$$

So far ts(u) is only defined for units of work u that perform writes. For a unit of work that consists entirely of read events, let ts(u)=ts(i) for some i such that event(i)=Ru(l).

The predicate temp(u,i,l) is true if location l is temporary for unit of work u at index i, meaning that there will be another write to l in u beyond index i. It is false for unit of work u at index i if i represents the index of the last write to l in u. For reads, we take the value of temp(u,i,l) to be the value temp(u, j,l), where j is the index of the last write by u to l. Initially, temp(u,0,l)=false, for all u and l. It is computed as follows:

$$temp(u, i, 1) = \begin{vmatrix} \text{true} & \text{if event}(i) = W_\alpha(1) \land \exists j > i\xi \text{ event}(j) = W_\alpha(1) \\ \text{false} & \text{if event}(i) = W_\alpha(1) \land \alpha j > i\xi \text{ event}(j) = W_\alpha(1) \\ temp(u, i, 1, 1) & \text{otherwise} \end{vmatrix}$$

FIG. 5 shows a sample execution and its timestamps. In this example, there are two units of work u1 and u2 in different threads, and two locations l1 and l2. We have ts(u1)=1 and ts(u2)=2. At index 2, unit of work u2 reads an intermediate value of location l1. This is captured by temp(u1,2,l1) being true.

The following lemma (Lemma 1) states that the timestamps of write events on the same memory location l are monotonically increasing: In an execution that is not in accordance with the interleaving scenarios of Definition 1, if i and j are such that i<j, event(i)=Wu(l) and event(j)=Wu'(l) for some l, and u u', then ts(i)<ts(j).

A second lemma (Lemma 2) states that the state observed in a unit of work is consistent, by giving three properties of read events in an execution that is not in accordance with any of the scenarios in Definition 1. First, no temporary value is ever read. Second, reads in a unit of work that also writes the same atomic set do not get stale values. Third, two reads in a unit of work that does not perform any writes to same atomic set get consistent values.

Thus, according to Lemma 2, in an execution that is not in accordance with any of the interleaving scenarios of Definition 1:

(1) No event from one unit of work reads a memory location marked as temporary by another unit of work:

$$\forall u, i, l\xi \text{event}(i) = R_u(l) \Rightarrow \alpha u' \neq u\xi \text{temp}(u', i, l).$$

(2) A read in a unit of work that also contains a write to the same atomic set does not get a stale value, i.e., it gets the timestamp corresponding to the unit of work or the previous one:

$$\forall i\xi (\text{event}(i) = R_u(l) \land \exists j\xi \text{event}(j) = W_u(l)) \Rightarrow ts(i) \in \{ts(u), \text{prev}(ts(u))\}.$$

(3) Reads in a unit of work u that does not contain writes, get the same timestamp.

$$\forall ij\xi (\text{event}(i) = R_u(l) \land \text{event}(j) = R_u(l') \land \alpha k\xi \text{event}(k) = W_u(l)) \Rightarrow ts(i) = ts(j) = ts(u).$$

Finally, we determine that for an execution that is not in accordance with any of the interleaving scenarios of Definition 1, its projection on each atomic set is serializable, which we define precisely below. We can think of a unit of work as being a single threaded transaction that always commits, and this allows us to use concepts from serializability theory. See: P. Bernstein, V. Hadzilacos, N. Goodman. "Concurrency Control and Recovery in Database Systems", Addison-Wesley, 1987. Given an execution E and an atomic set L, the projection of E on L is an execution that has every event on L in E in the same order. Given indices i and i' such that i<i', the pair (event(i), event(i')) is a conflicting pair of events, if they are on the same memory location and one of them is a write. We say that two executions are equivalent if they consist of the same units of work and the same events, and have the same pairs of conflicting events. An execution is serial if for every two units of work u and u' that appear in it, either all events in u happen before all events in u', or vice versa. We say that an execution is serializable if it is equivalent to an execution that is serial.

The conflict graph of an execution is a directed graph, with nodes consisting of units of work. There is an edge between units of work u and u', if u and u' have events e and e', respectively, such that (e,e') is a conflicting pair. The Serializability Theorem states that an execution is serializable, if and only if its conflict graph is acyclic. P. Bernstein, V. Hadzilacos, N. Goodman. "Concurrency Control and Recovery in Database Systems", Addison-Wesley, 1987. We use this fact to prove Theorem 1 (serializability): For an execution that is not in accordance with any of the interleaving scenarios of Definition 1, its projection on each atomic set is serializable.

We now discuss how the abstract model of the previous discussion can be applied to an actual programming language such as Java. We introduce a programming construct for marking fields of an API as forming an atomic set, and assume that its public and protected methods are units of work for those sets, excluding any constructors. The syntax of atomic set constructs is given in FIG. 6. The modifier atomic(label) indicates that the field being declared belongs to atomic set named label. Labels are globally unique identifiers. Fields can belong to at most one set. Objects in such fields must not be used as monitors, meaning that there are no wait or notify performed on them. Atomic sets must consist entirely of instance fields or entirely of static ones.

The atomic set construct guarantees to the programmer that no intermediate state of an atomic set in a unit of work is observed by others. It is therefore a statement about the visibility of intermediate states. Referring again to FIG. 1, marking x and y as being part of atomic set loc ensures that when adjustLocation is executed, the intermediate state (x, y)=(1.0, 0.0) cannot be observed by other public methods. On the other hand, the four fields belong to two different atomic sets, so intermediate states of print involving a consistent state of (x, y) and a consistent state of (width, height) are observable. Consider two print methods executing concurrently, starting from a state where all fields are 0.0. It is possible for the first one to print "x=1.0 y=1.0 width=2.0 height=2.0", and for the second one to observe the state: (x, y, width, height)=(1.0, 1.0, 0.0, 0.0) and print "x=2.0 y=2.0 width=1.0 height=1.0". This happens if the first print method executes everything before the call to adjustDimension, and then the second one executes entirely, followed by the rest of the first one. However, if we declare all four fields to be part of an atomic set, then this is no longer possible. The state: (x, y, width, height)=(1.0, 1.0, 0.0, 0.0) then becomes an intermediate state of that atomic set in unit of work print and must not be observed by other units of work. Thus by grouping more fields in an atomic set, we reduce the number of intermediate states observable, as well as the amount of concurrency.

Fields should comprise an atomic set when they have some common consistency property, i.e. must be updated atomically. The construct is especially useful when there are multiple independent fields in an API. The traditional approach is to declare a lock for each. The programmer must keep track of all the locks, and add synchronization to the code appropriately, which can be error-prone. The atomic set construct helps to reduce the burden on the programmer by inferring synchronization automatically. Moreover, it allows for better extensibility, by making it easier for the programmer to change the level of concurrency. In the traditional approach, all the synchronized blocks need to be found and changed manually. In our approach, however, only a few declarations need to be changed—including or removing fields from atomic sets—in order to modify the amount of concurrency.

It is possible for the programmer to make mistakes in declaring atomic sets, which may result in allowing more concurrency, and violations of correctness specifications. However, we believe that it is easier to mark fields as atomic, than to add synchronization manually. This is because a lot of the reasoning that goes into allocating locks to different subsets of the fields of a class is the same as what is needed for figuring out which fields must be in an atomic set. Our construct allows the programmer to express this directly, and rely on our analysis engine to find all the places where synchronization is needed.

We now discuss a synchronization inference engine according to the invention. In order to use this tool, the programmer needs to be aware of some assumptions. First, it is intended to add proper synchronization to an API which owns its representation. This is the case for any, well-designed API, and we found it to hold for all examples considered. In particular, fields included in atomic sets must be internal to the API, meaning that they are owned by it and do not escape. This is because we use synthetic locks for each atomic set, and do not hold locks directly on the fields. So if the object referenced by a field is shared with another entity that holds a lock on it, then our synthetic locks may not provide the right synchronization. Inner classes that require synchronization on fields declared in the containing class must also be internal. Second, we require a complete API, in the sense that the types it references must be available to the analysis.

Synchronization inference works in two steps. First, an analysis determines for each unit of work, what atomic sets it reads and writes. Second, this information is used to determine the smallest code block that needs synchronization within each unit of work. For this application, we ignore the intricacies of the problematic interleaving scenarios, and add synchronization to code blocks surrounding all reads and writes to an atomic set in a unit of work. This is a very conservative approximation but turned out to be sufficient for our examples. For a different application, such as high-level data race detection, the intricacies of the interleaving scenarios would need to be taken into account.

FIG. 7 shows the pseudocode for the first step in synchronization inference. SCC denotes a strongly connected component. The first step is to compute, for each unit of work and each atomic set, the fields of the given set that the given unit of work reads and writes. This can be done as a single bottom-up pass over the call graph of each unit of work, assigning to each node in the graph two sets of fields—one for reads and one for writes—comprised of those fields accessed in that node and those accessed by its callees. This is shown in FIG. 7; the local analysis of a method (LocalReads(S) and LocalWrites(S)) simply traverses the body recording explicit field access operations.

This analysis is separate for each unit of work, and thus is applicable to incomplete programs. Indeed, a call graph can be built for each unit of work in isolation, the only requirement being a conservative model of the world beyond. The whole analysis is conservative given a conservative estimate of the types of the parameters for units of work.

The second step is to infer what code blocks in a unit of work need synchronization, knowing what atomic sets it accesses. We associate a synthetic lock with each set, and synchronize on these. The objective is to find the smallest code block containing all the accesses for each atomic set. In the case of a loop, which has accesses in its body, this means synchronizing the whole loop, since its body is potentially visited more than once. The resulting code must be syntactically correct. In particular, care must be taken so that local variable declarations are not separated from their uses. If a synchronized block contains a local variable declaration, then we expand it, so that all uses are in the same scope. Moreover, some code blocks accessing different atomic sets may have statements in common. In this case, we join the code blocks into a single larger block that contains them all, and acquire all the necessary locks at the top. When multiple locks need to be acquired, we choose an arbitrary total order for them, and acquire them in this order everywhere in the API, to avoid deadlock. It is possible to further optimize these design choices. We could, for example, refactor the code so that local variable declarations are pulled out of the synchronized blocks so that these do not need to be expanded.

Most static and dynamic race detectors, as well as type systems and languages that guarantee race freedom are based on the common definition of data races and therefore do not handle high-level races. Type systems use redundant annotations to verify that data races do not occur. Some known approaches present a type system that allows the programmer to annotate each field with the lock that must protect it. In contrast, our system does not require the programmer to keep track of locks explicitly when adding synchronization to a class, and simplifies reasoning about concurrency by inferring synchronized blocks.

An extension to ESC/Java detects a class of high-level data races, called "stale-value errors" and "Finding stale-value errors in concurrent programs". See SRC Technical Note 2002-004, May 2002. The value of a local variable is stale if it is used beyond the critical section in which it was defined, and in particular if it is used in another critical section. Scenario 1 of our definition of high-level data races addresses stale-value errors. However, it is presented in a framework that is independent of any implementation construct. The same scenario covers both low-level and high-level data races. View consistency is a correctness criterion that ensures that multiple reads in a thread observe a consistent state. A view is defined to be the set of variables that a lock protects. Two threads are view consistent if all the views in the execution of one, intersected with the maximal view of the other, form a chain under set inclusion. View consistency can be checked dynamically or statically. See C. Artho, K. Havelund, and A. Biere. "High-Level Data Races," Workshop on Verification and Validation of Enterprise Information Systems (VVEIS), April 2003. Scenarios 8 through 11 of our definition of high-level data races address the issue of multiple reads getting an inconsistent state. In our approach, however, the programmer indicates explicitly what sets of locations form an atomic set, so this information does not need to be extracted from the locking structure of the code. Our definition also covers a larger set of high level data races.

Atomicity is a non-interference property that has proven useful in reasoning about multi-threaded programs. See C. Flanagan and S. Qadeer. "A Type and Effect System for Atomicity", Programming Language Design and Implementation (PLDI), 2003. An atomic code block can be assumed to execute serially without interleaved steps from other threads. A number of tools have been developed for checking atomicity violations, including static typing systems; dynamic analysis such as the Atomizer which combines Lipton's theory of reduction and ideas from dynamic race detectors; and model checking techniques. Instead of marking code blocks as atomic, we mark sets of fields as forming atomic sets. Our definition for high level data races offers insight into why a code block needs to be synchronized, and we infer synchronized blocks automatically within given units of work. From the programmer's perspective, a unit of work restores atomic sets to consistent states when executed sequentially. When synchronization is added, units of work become atomic code blocks only with respect to each atomic set. For each, there exists a serial order for the units of work in an execution, but there may not be a global serial order across all of them. Reasoning about a multithreaded program is simplified by allowing the programmer to speak about the amount of concurrency in a declarative way. The programmer only needs to specify which memory locations need to be manipulated atomically, and the system takes care of adding synchronization anywhere it may be needed in the API.

Our problematic interleaving scenarios are similar to those used by Wang and Stoller to provide run-time analyses for atomicity. See L. Wang and S. Stoller, "Run-Time Analysis for Atomicity", In Proceedings of the Third Workshop on Runtime Verification (RV03), volume 89(2) of Electronic Notes in Theoretical Computer Science. Elsevier, 2003. Our scenarios are simpler, and more importantly they are complete, meaning that an execution not displaying them is guaranteed to have a property related to serializability.

Software transactional memory is a method for alleviating the burden on the programmer in determining which locks to hold, by allowing code blocks to be marked as "atomic sections". See T. Harris, S. Marlowe, S. Peyton-Jones, and M. Herlihy, "Composable Memory Transactions", Proceedings of the ACM SIGPLAN Symposium on Principles and Practice of Parallel Programming (PPoPP), Chicago, Ill., June 2005. An implementation of this method needs to guarantee that there exists a global serial order of execution for the atomic sections. This is in general hard to implement in an imperative language, and requires specialized hardware. The requirement for our units of work is that there exists a serial order with respect to each atomic set, and there may not be a global serial order. By weakening the guarantee, while still maintaining correctness, we have a method that is much easier to implement.

Our definition of high-level data races is based on anomalies used to characterize levels of isolation in databases, and defined in the ANSI SQL standard. See ANSI X3.135—1992, American National Standard for Information Systems—Database Language—SQL, November 1992 and H. Berenson, P. Bernstein, J. Gray, J. Melton, E. O'Neil, P. O'Neil. "A Critique of ANSI SQL Isolation Levels", In ACM SIGMOD International Conference on Management, May 1995. Commercial databases allow programmers to trade off consistency for performance by offering different levels of isolation. Each level is characterized by the set of anomalies it does not allow. The highest level of isolation is serializability. Our definition is in terms of interleaving scenarios, similar to the schedules used to express the database anomalies. Some of these needed to be adapted because they explicitly talked about a transaction committing or aborting, and not all of them were directly applicable in the context of concurrent programming.

Atomic sets share characteristics with data groups. See K. R. M. Leino. "Data Groups: Specifying the Modification of Extended State", In OOPSLA '98, 1998. Data groups solve a problem in the specification of methods whose overrides may modify additional state introduced in subclasses. They represent a set of variables and can be listed in the 'modifies' clause of a specification. A method that is allowed to modify a data group, is allowed to modify its downward closure, consisting of all member variables added in subclasses. Atomic sets are similar in that subclasses may add locations to a set declared in a parent class. They differ in that, unlike data groups, they are not hierarchical and non-overlapping.

A publication by Deng et al. presents a method that allows the user to specify synchronization patterns that are used to synthesize synchronized code. See X. Deng, M. Dwyer, J. Hatcliff, and M. Mizuno. "Invariant-Based Specification, Synthesis, and Verification of Synchronization in Concurrent Programs" in International Conference on Software Engineering (ICSE), May 2002. The generated code can then be verified using the Bandera toolset. The user must specify explicitly the regions of code that need synchronization, together with integer constraints that represent patterns of synchronization between them. This is done by recording the number of threads that enter a region a code in a counter, as well as the number that exit. Synchronization patterns are then expressed using these counters. Our atomic set construct is simpler to express, and we do not require the user to indicate explicitly the regions that need synchronization. We also only focus on one kind of synchronization pattern: exclusion between two regions that access the same atomic set.

Referring to FIG. 8, there is shown a flow chart illustrating a high level information processing method 800 according to an embodiment of the invention. The method 800 comprises steps for ensuring consistency of data and avoiding data races. In step 802 we examine a computer program written in an object-oriented language. In step 804 we receive sequences of accesses that form logical operations on a set of memory locations. In step 806 we receive atomic sets of memory locations. In step 808 we provide a message indicating where the synchronization is required.

Therefore, while there has been described what is presently considered to be the preferred embodiment, it will be under-

We claim:

1. A method for ensuring consistency of data and preventing data races, the method comprising:
   receiving and examining a computer program written in an object-oriented language;
   receiving sequences of accesses that form logical operations on a set of memory locations used by the computer program;
   receiving definitions of atomic sets of data from the memory locations, wherein said atomic sets are sets of data that indicate an existence of a consistency property without requiring the consistency property itself;
   inferring which code blocks of the computer program must be synchronized in order to prevent one or more data races in the computer program, wherein synchronization is inferred by determining by:
      analyzing for each unit of work, what atomic sets are read and written by the unit of work, wherein said unit of work comprises non-overlapping threads;
      ordering units of work by occurrence of the units of work first write events in an execution;
      associating a unique timestamp with each unit of work, respecting the order, by:
         assigning a timestamp to a write event of the unit of work to which the event belongs;
         assigning a timestamp to a read event of a most recent write to a memory location the event is reading; and
         marking a location as temporary until a last write is completed when a memory location gets written more than once by a unit of work; and
   providing a message indicating where synchronization is required.

2. The method of claim 1, wherein receiving the definitions of the atomic sets of data comprises receiving said definitions from a programmer.

3. The method of claim 1, wherein a programmer specifies the logical operations.

4. The method of claim 1, wherein synchronization is inserted by using locks that block access to data that is being processed by the logical operation until that logical operation is concluded.

5. The method of claim 1 further comprising detecting problematic interleaving scenarios for accesses to the atomic sets.

6. The method of claim 5 wherein detecting the problematic interleaving scenarios comprises detecting concurrent accesses that are likely to produce the data race.

7. The method of claim 1 further comprising a step of uncovering unnecessary synchronization.

8. The method of claim 1 wherein inferring synchronization further comprises:
   assuming that each execution is such that every unit of work that writes some location in the atomic set, writes every location in that atomic set; and
   using the analysis to determine a smallest code block surrounding all reads and writes to the atomic set in the unit of work.

9. The method of claim 8 further comprising adding synchronization to the smallest code block.

10. A method for detecting data races, the method comprising:
    receiving and examining a computer program written in an object-oriented language;
    receiving sequences of accesses that form logical operations on a set of memory locations used by the program;
    receiving definitions of atomic sets of the memory locations, wherein said atomic sets are sets of data that indicate an existence of a consistency property without requiring the consistency property itself;
    determining whether the logical operations operating on the sets of data are serializable per atomic set;
    when the logical operations are serializable, performing:
       ordering units of work by occurrence of the units of work first write events in an execution;
       associating a unique timestamp with each unit of work, respecting the order, by:
          assigning a timestamp to a write event of the unit of work to which it belongs;
          assigning a timestamp to a read event of a most recent write to a memory location the event is reading; and
          marking a location as temporary until a last write is completed when a memory location gets written more than once by a unit of work; and
    providing a message indicating any existing data races in the code.

11. The method of claim 10, wherein a programmer specifies the atomic sets.

12. The method of claim 10, wherein a programmer specifies the logical operations.

13. The method of claim 10 further comprising detecting problematic interleaving scenarios for accesses to the atomic sets.

14. The method of claim 13 wherein detecting the problematic interleaving scenarios comprises detecting concurrent accesses that are likely to produce the data race.

15. A non-transitory computer-readable medium comprising instructions for:
    receiving and examining a computer program written in an object-oriented language;
    receiving sequences of accesses that form logical operations on a set of memory locations used by the program;
    receiving definitions of atomic sets of data of the memory locations, wherein said atomic sets of data are sets of data that indicate an existence of a consistency property without requiring the consistency property itself;
    inferring which code blocks of the computer program must be synchronized in order to prevent one or more data races in the computer program;
    ordering units of work by occurrence of their first write events in an execution;
    associating a unique timestamp with each unit of work, respecting this order, by:
       assigning a timestamp to a write event of the unit of work to which it belongs;
       assigning a timestamp to a read event of a most recent write to a memory location it is reading;
    marking a location as temporary until a last write is completed when a memory location gets written more than once by a unit of work; and
    providing a message indicating where the synchronization is required.

16. The medium of claim 15 wherein inferring which code blocks must be synchronized comprises:
    determining by analysis for each unit of work, what atomic sets are read and written by the unit of work, wherein the unit of work comprises non-overlapping threads.

17. The medium of claim 15 further comprising inserting synchronization by using locks that block access to data that is being processed by the logical operation until said logical operation is concluded.

18. The medium of claim 15 further comprising an instruction for detecting problematic interleaving scenarios for accesses to atomic sets of data by detecting concurrent accesses that are likely to produce the data race.

19. An information processing system comprising:
- a computer program embodied in a non-transistor computer-readable medium written in an object-oriented language;
- atomic sets of memory locations used by the computer program, wherein said atomic sets are sets of data that indicate an existence of a consistency property without requiring the consistency property itself;
- an inference engine analyzing accesses to the atomic sets;
- inferring which code blocks of the computer program must be synchronized in order to prevent one or more data races in the computer program, wherein synchronization is inferred by determining by analysis for each unit of work, what atomic sets are read and written by the unit of work, wherein said unit of work comprises non-overlapping threads;
- ordering units of work by occurrence of their first write events in an execution;
- associating a unique timestamp with each unit of work, respecting this order, by:
  - assigning a timestamp to a write event of the unit of work to which it belongs;
  - assigning a timestamp to a read event of a most recent write to a memory location it is reading;
- marking a location as temporary until a last write is completed when a memory location gets written more than once by a unit of work; and
- providing a message indicating where synchronization is required.

* * * * *